United States Patent
Barron et al.

(10) Patent No.: US 9,587,557 B2
(45) Date of Patent: Mar. 7, 2017

(54) VTG TURBOCHARGER VANE PACK ASSEMBLY WITH ABRADABLE COATING

(71) Applicant: BorgWarner Inc., Auburn Hills, MI (US)

(72) Inventors: Luke Barron, W. Yorkshire (GB); Steve Birnie, W. Yorkshire (GB); Alan Wint, Burntwood Staffordshire (GB)

(73) Assignee: BorgWarner Inc., Auburn Hills, MI (US)

( * ) Notice: Subject to any disclaimer, the term of this patent is extended or adjusted under 35 U.S.C. 154(b) by 337 days.

(21) Appl. No.: 14/396,154

(22) PCT Filed: Apr. 19, 2013

(86) PCT No.: PCT/US2013/037367
§ 371 (c)(1),
(2) Date: Oct. 22, 2014

(87) PCT Pub. No.: WO2013/165703
PCT Pub. Date: Nov. 7, 2013

(65) Prior Publication Data
US 2015/0050129 A1    Feb. 19, 2015

Related U.S. Application Data

(60) Provisional application No. 61/639,955, filed on Apr. 29, 2012.

(51) Int. Cl.
*F01D 17/16* (2006.01)
*F02B 37/24* (2006.01)
*F01N 13/16* (2010.01)

(52) U.S. Cl.
CPC .............. *F02B 37/24* (2013.01); *F01N 13/16* (2013.01); *Y02T 10/144* (2013.01)

(58) Field of Classification Search
CPC .... F02B 37/24; F01D 11/122; F05D 2230/90; F05D 2250/90
See application file for complete search history.

(56) References Cited

U.S. PATENT DOCUMENTS

| | | |
|---|---|---|
| 6,679,057 B2 | 1/2004 | Arnold |
| 7,021,057 B2 | 4/2006 | Sumser et al. |
| 8,083,474 B2 * | 12/2011 | Hashimoto ........... F01D 17/165 415/160 |

(Continued)

*Primary Examiner* — Ninh H Nguyen
(74) *Attorney, Agent, or Firm* — A. Michael Tucker; Stephan A. Pendorf; Patent Central LLC

(57) ABSTRACT

A vane pack for a VTG turbocharger is provided. The vane pack includes a plurality of vanes pivotably positioned between an inner surface of an upper vane ring and an inner surface of a lower vane ring. Clearances are defined between opposing cheek surfaces of the vanes and the inner surfaces of the vane rings. The vane pack is configured to minimize these clearances by applying an abradable coating is to the inner surface of the upper vane ring, the inner surface of the lower vane ring and/or cheek surface(s) of one or more of the vanes. In this way, an essentially zero clearance can be established without interfering with the proper function of the vanes. As a result, there can be gains in efficiency. Further wearing of the abradable coating may occur during turbocharger operation.

5 Claims, 3 Drawing Sheets

(56) References Cited

U.S. PATENT DOCUMENTS

| | | | |
|---|---|---|---|
| 8,383,203 B2 * | 2/2013 | Belhadjhamida | C22C 19/07 427/180 |
| 8,641,372 B2 * | 2/2014 | Stein | F02C 6/12 415/160 |
| 2009/0022580 A1 | 1/2009 | Hall | |
| 2009/0272112 A1 | 11/2009 | Arnold et al. | |
| 2010/0008766 A1 | 1/2010 | Scholz et al. | |
| 2012/0082539 A1 * | 4/2012 | Mohiki | F01D 17/165 415/159 |

\* cited by examiner

VTG TURBOCHARGER VANE PACK ASSEMBLY WITH ABRADABLE COATING

FIELD OF THE INVENTION

Embodiments related in general to turbochargers and, more particularly, to vane packs for variable turbine geometry turbochargers.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. A smaller turbocharged engine, replacing a normally aspirated engine of a larger physical size, will reduce the mass and can reduce the aerodynamic frontal area of the vehicle.

Referring to FIG. 1, a turbocharger (10) uses the exhaust flow from the engine exhaust manifold to drive a turbine wheel (12), which is located in a turbine housing (14) to form a turbine stage (16). The energy extracted by the turbine wheel (12) is translated into a rotating motion which then drives a compressor wheel (18), which is located in a compressor cover (20), to form a compressor stage (22). The compressor wheel (18) draws air into the turbocharger (10), compresses this air, and delivers it to the intake side of the engine.

Variable Geometry turbochargers typically use a plurality of rotatable vanes (24) to control the flow of exhaust gas, which impinges on the turbine wheel (12) and controls the power of the turbine stage (16). These vanes (24) also therefore control the pressure ratio generated by the compressor stage (22). In engines, which control the production of NOx by the use of High Pressure Exhaust Gas Recirculation (HP EGR) techniques, the function of the vanes (24) in a VTG also provides a means for controlling and generating exhaust back pressure.

An array of pivotable vanes (24) is located between a generally annular upper vane ring (UVR) (26) and a generally annular lower vane ring (LVR) (28). Each vane rotates on a pair of opposing axles (30) (FIG. 2), protruding from said vane (24) with the axles on a common axis. Each axle (30) is located in a respective aperture in the LVR (28) and a respective aperture in the UVR (30). The angular orientation of the UVR (26), relative to the LVR (28), is set such that the complementary apertures in the vane rings (26, 28) are concentric with the axis of the axles (30) of the vane (24), and the vane (24) is free to rotate about the axis (32) of the two axles (30), which is concentric with the now established centerline of the two apertures. Each axle (30) on the UVR side of the vane (24) protrudes through the UVR (26) and is affixed to a vane arm (34), which controls the rotational position of the vane (24) with respect to the vane rings (26, 28). Typically, there is a separate ring which controls all of the vane arms (34) in unison via small sliding blocks (48). This unison ring (50) is controlled by an actuator which is operatively connected to rotate the unison ring (50). The actuator is typically commanded by the engine electronic control unit (ECU). The assembly consisting of the plurality of vanes (24) and the two vane rings (26, 28) is typically known as the vane pack.

In a vane pack, the clearance between the rotatable vanes (24), more specifically between the cheeks (36) of the vanes (24) and the inner surfaces (38, 40) of the upper and lower vane rings (26, 28), is a major contributor to a loss of efficiency in both the control of exhaust gas allowed to impinge on the turbine wheel (12) and in the generation of backpressure upstream of the turbine wheel (12). The clearances between the vane side cheeks (36) and the complementary inner surfaces (38, 40) of the vane rings (26, 28) should be kept to a minimum to increase the efficiency of the vane pack.

However, minimizing such clearances can be difficult. Because the turbine housing (14) is not symmetrically round in a radial plane, and because the heat flux within the turbine housing (14) is also not symmetrical, the turbine housing (14) is subject to asymmetric stresses and asymmetric thermal deformation. Thermal deformation in the turbine housing (14) is transferred to the vane pack, which can cause the vane pack to wear, stick, or completely jam. Thus, the vane pack must be accurately placed and constrained within the turbine housing (14) in a manner which minimizes the transference of thermally induced distortion.

Thus, there is a need for a vane pack configuration that can minimize such concerns.

SUMMARY OF THE INVENTION

Embodiments are directed to systems for minimizing the clearance between vane cheeks and the inner surfaces of the vane rings in a vane pack for a variable geometry turbocharger. According to embodiments herein, an abradable coating is applied to an inner surface of an upper vane ring, an inner surface of a lower vane ring and/or cheek surface(s) of a vane. In this way, a very small clearance can be established without interfering with the proper function of the vanes during turbocharger operation. As a result, there can be gains in efficiency.

BRIEF DESCRIPTION OF THE DRAWINGS

The present invention is illustrated by way of example and not limitation in the accompanying drawings in which like reference numbers indicate similar parts and in which.

DETAILED DESCRIPTION OF THE INVENTION

Figure 1:
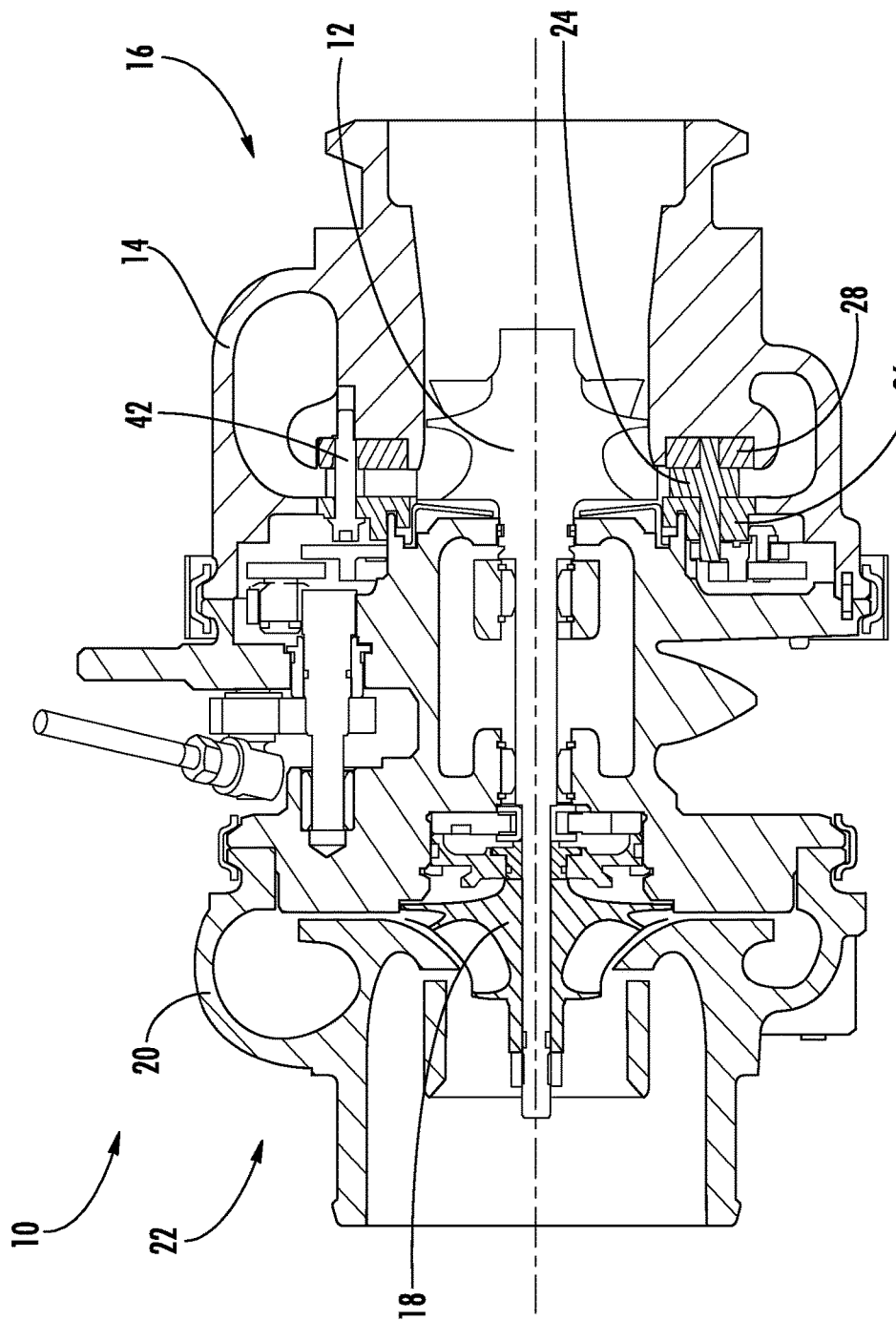
FIG. 1 is a cross-sectional view of a typical variable geometry turbocharger.
Figure 2:
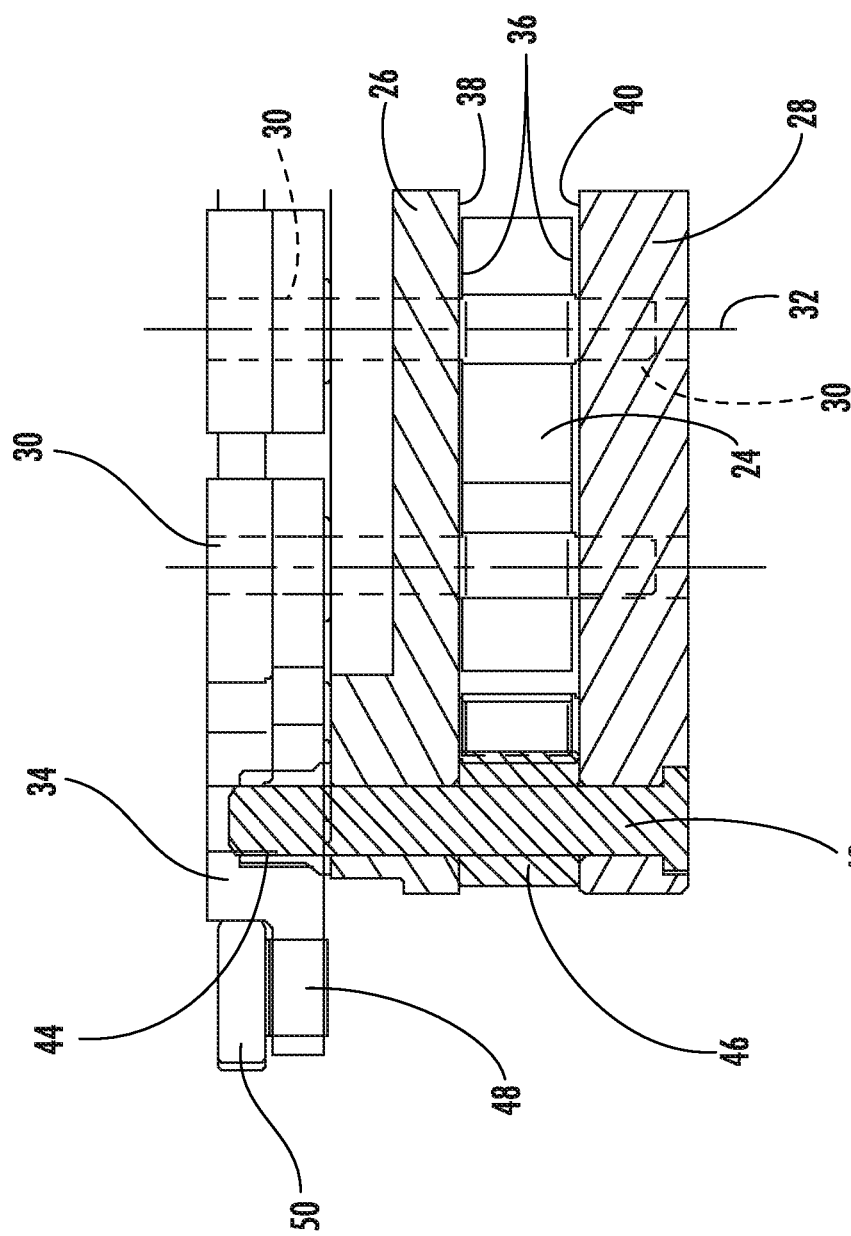
FIG. 2 shows a cross-sectional view of a typical vane pack.
Figure 3:
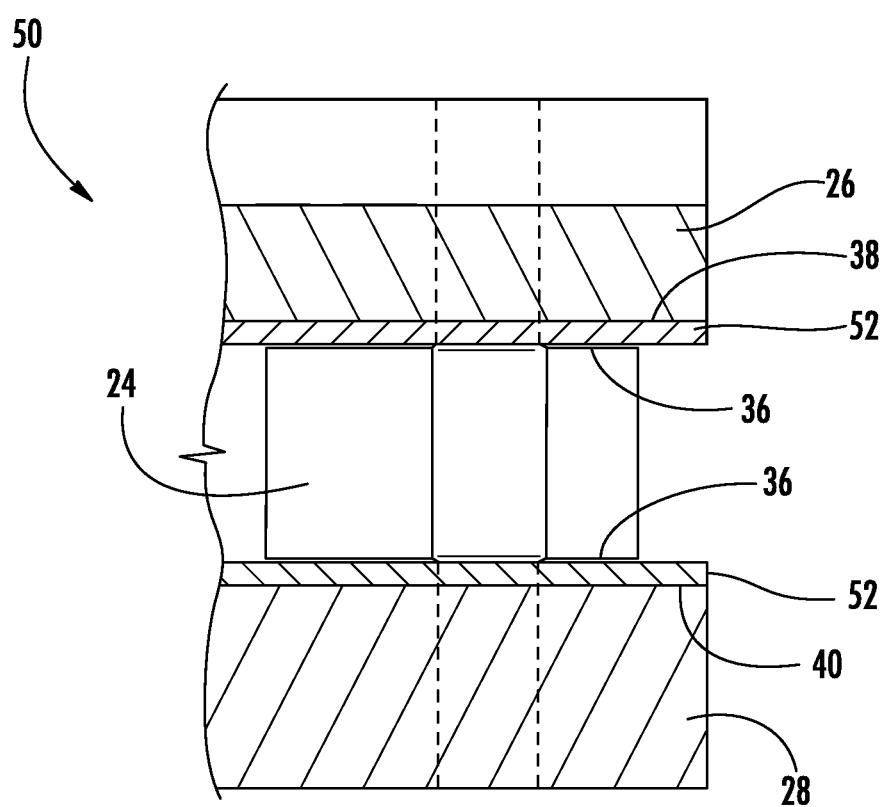
FIG. 3 shows a view of an assembled vane pack.

Arrangements described herein relate to a system and method for a vane ring assembly. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIG. 3, but the embodiments are not limited to the illustrated structure or application.

According to embodiments herein, an abradable coating is applied to one or more of the surfaces that define the clearance between the vanes and the vane rings. Referring to FIG. 3, a portion of a vane pack (50) is shown. Only one vane (24) is shown for purposes of clarity. An abradable coating (52) can be applied to at least a portion of the inner surface (40) of the LVR (28), at least a portion of the inner surface (38) of the UVR (26) and/or at least a portion of one or both of the cheek surfaces (36) of the vanes (24). In one embodiment, the abradable coating (52) can be applied to the inner surfaces (38, 40) of the vane rings (26, 28), but not on the cheek surfaces (36) of the vanes (24).

The abradable coating (52) can be provided in any suitable thickness on the treated surface. The thickness of the abradable coating (52) can be substantially uniform across the surface. Alternatively, the thickness of the coating (52) can vary in one or more locations. When the coating (52) is applied to a plurality of coating defining surfaces, the thickness of the coating (52) on one of the coating defining surfaces can be substantially equal to the thickness of the coating (52) on another one of the coating defining surfaces. Alternatively, the thickness of the coating (52) on one of the coating defining surfaces can be different from the thickness of the coating (52) on another one of the coating defining surfaces.

The abradable coating (52) can be any suitable material that can allow abrasive contact between the vane cheeks (36) and the inner surfaces (38, 40) of the vane rings (26, 28). In one embodiment, the abradable coating (52) can be Metco 480NS, which is available from Sulzer Metco (US) Inc., Westbury, N.Y. Such a coating can be a spheroidal, gas atomized alloy comprising 95% Nickel and 5% Aluminum. The particle size can range from about 45 µm to about 90 µm and/or approximately −170+325 mesh (e.g., about 90% or more of the material can pass through a 170 mesh sieve and can be retained by a 350 mesh sieve). The abradable coating can be dense and resistant to oxidation. The coating can withstand temperatures of at least about 800° C. (1470° F.). The coating can be self-bonding and can undergo an exothermic reaction during spraying, resulting in excellent bonding to the substrate. Materials similar to Metco 480NS can be used.

Additional examples of suitable abradable coatings include aluminium silicon alloy/polymer composites, aluminium silicon alloy/graphite composites, nickel/graphite composites, aluminium bronze/polymer composites, nickel chromium aluminium/boron nitride composites, nickel chromium aluminium/bentonite composites, nickel/aluminium composite sprayed porous, nickel chromium aluminium composite sprayed porous, MCrAlY/BN/Polyester composites and Yttria-stabilized zirconia (YSZ) ceramic/Polyester composites. Such coatings can be applied by thermal spraying.

In one embodiment, the abradable coating (52) can be a zirconia-polymer ceramic abradable powder. Such a powder can be applied by thermal spraying. Examples of such coatings include DURABLADE 2192, Sulzer Metco 2395 and/or Sulzer Metco 2460NS, which are available from Sulzer Metco (US) Inc., Westbury, N.Y.

DURABLADE 2192 can comprise about 9.5% $Dy_2O_3$, about 4.5% polymer, 0.7 hBN and the balance can substantially comprise $ZrO_2$ (with a maximum of 2.5 wt % hafnia). The nominal particle size distribution can be from about −176+11 µm with an average of about 65 µm. The service temperature can be less than or equal to about 1150° C. (2100° F.). DURABLADE 2191 can have a porosity of about 25-35%. It can have a hardness of about 70-90 HR15Y. It can have a coating strength of greater than 3 MPa (435 psi).

Sulzer Metco 2395 can comprise about 7.5% $Y_2O_3$, about 4.5% polymer, 0.7 hBN and the balance can substantially comprise $ZrO_2$ (with a maximum of 2.5 wt % hathia). The nominal particle size distribution can be from about −176+11 µm with an average of about 57 µm. The service temperature can be less than or equal to about 1150° C. (2100° F.). Sulzer Metco 2395 can have a porosity of about 25-40%. It can have a hardness of about 70-90 HR15Y. It can have a coating strength of greater than 3 MPa (435 psi).

Sulzer Metco 2460NS can comprise about 7.5% $Y_2O_3$, about 4.5% polymer, about 4% binder and the balance can substantially comprise $ZrO_2$ (with a maximum of 2.5 wt % hafnia). The nominal particle size distribution can be from about −176+11 µm with an average of about 74 µm. The service temperature can be less than or equal to about 1150° C (2100° F.). Sulzer Metco 2460NS can have a porosity of about 15-30%. It can have a hardness of about 80-95 HR15Y. It can have a coating strength of greater than 4 MPa (580 psi).

Further suitable abradable coatings include TECH 17, TECH 28 and/or TECH 40, which are available from Bodycote K-Tech Ltd., Cheshire, England. A coating comprising TECH 17 can have a thickness of less than about 5 µm. The maximum hardness can be about 2600 Hv. A TECH 28 coating can have a thickness of about 50 to about 100 µm with a hardness of about 1850 Hv. TECH 40 can have a coating thickness of of about 50 to about 100 µm with a hardness of about 2850 Hv.

Materials similar to those listed above may also be suitable. However, embodiments are not limited to any particular material. When the abradable coating (52) is applied to a plurality of coating defining surfaces, the material of the coating (52) on one of the coating defining surfaces can be the same as the material of the coating (52) on another one of the coating defining surfaces. Alternatively, the material of the coating (52) applied on one of the coating defining surfaces can be different than the material of the coating (52) applied on another one of the coating defining surfaces.

The abradable coating (52) can be applied on one or more of the clearance defining surfaces in any suitable manner. Once the abradable coating (52) is applied it can be machined, if necessary. The vane pack (50) can be assembled with an interference fit between the clearance defining surfaces. As an example, there can be an interference fit between the uncoated vane cheeks (36) and the coated upper vane ring (26) and/or the coated lower vane ring (28). Before the vane pack (50) is installed in the turbine housing (14), the vane pack (50) can be installed in a fixture and subjected to vibration or oscillations. In this way, the vanes (24) can engrave the abradable coating (52) and can establish an essentially zero or very small clearance therebetween while still allowing the vanes (24) to properly function during turbocharger operation.

During turbocharger operation, the small clearance will minimize the leakage of exhaust gas flow through the space between the vane cheeks (36) and the inner surfaces (38, 40), thereby improving efficiency and performance. Further, it will be appreciated that if the clearance between the vane cheeks (36) and the inner surfaces (38, 40) reduces during turbocharger operation, the vanes (24) may come into contact with the abradable coating (52). In such case, the vanes (24) can further wear away the abradable coating (52) without substantially impeding the function of the vanes (24).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

The invention claimed is:

1. A vane pack (50) for a variable turbine geometry turbocharger comprising:
   an upper vane ring (26) having an inner surface (38);
   a lower vane ring (28) having an inner surface (40);
   a plurality of vanes (24) operatively positioned between the inner surfaces (38, 40) of the vane rings (26, 28), each vane (24) having opposing cheek surfaces (36), and
   an abradable coating (52) applied to at least a portion of one of the inner surfaces (38, 40) of the vane rings (26, 28), whereby a minimal clearance is established between the one or more coated inner surfaces (38, 40) and the vane cheeks (36).

2. The vane pack of the claim 1, wherein the abradable coating (52) is applied to both of the inner surfaces (38, 40) of the vane rings (26, 28).

3. The vane pack of claim 1, wherein the abradable coating (52) is applied to at least one of the cheek surfaces (36) of each vane (24).

4. A vane pack (50) for a variable turbine geometry turbocharger comprising:
   an upper vane ring (26) having an inner surface (38);
   a lower vane ring (28) having an inner surface (40);
   a plurality of vanes (24) operatively positioned between the inner surfaces (38, 40) of the vane rings (26, 28), each vane (24) having opposing cheek surfaces (36), and an abradable coating (52) applied to at least one of the cheek surfaces (36) of each vane (24), whereby a minimal clearance is established between the coated cheek surfaces (36) and a respective inner surface (38, 40) of the vane rings (26, 28).

5. The vane pack of the claim 4, wherein the abradable coating (52) is applied to at least a portion of at least one of the inner surfaces (38, 40) of the vane rings (26, 28).

* * * * *